Figure 1:
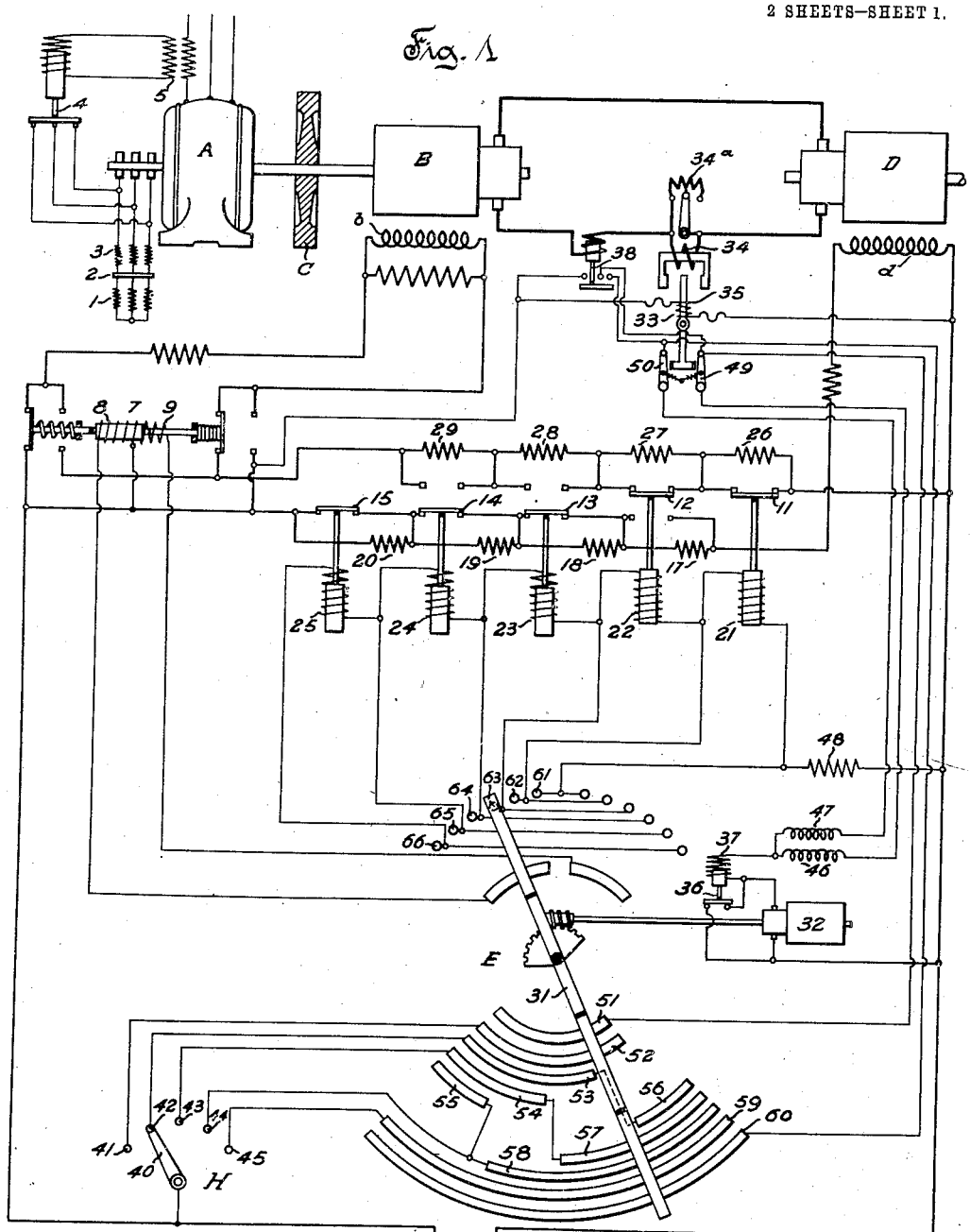

G. B. SCHLEY.
MOTOR CONTROL SYSTEM.
APPLICATION FILED JULY 22, 1911. RENEWED FEB. 5, 1913.

1,072,656. Patented Sept. 9, 1913.
2 SHEETS—SHEET 2.

Witnesses
Rob. E. Stoll
Clara E. Bensel

Inventor
George B. Schley
By Chas. E. Lord
Attorney

UNITED STATES PATENT OFFICE.

GEORGE B. SCHLEY, OF MILWAUKEE, WISCONSIN, ASSIGNOR TO ALLIS-CHALMERS COMPANY, A CORPORATION OF NEW JERSEY.

MOTOR-CONTROL SYSTEM.

1,072,656.  Specification of Letters Patent.  Patented Sept. 9, 1913.

Application filed July 22, 1911, Serial No. 639,976. Renewed February 5, 1913. Serial No. 746,372.

*To all whom it may concern:*

Be it known that I, GEORGE B. SCHLEY, a citizen of the United States, residing at Milwaukee, in the county of Milwaukee and State of Wisconsin, have invented certain new and useful Improvements in Motor-Control Systems, of which the following is a full, clear, and exact specification.

My invention relates to motor control systems.

A number of systems have been proposed whereby the moving parts in rolling-mills and in hoisting machinery may be electrically driven and economically and accurately controlled. In the most successful of these systems a special generator has been used for supplying the armature of the motor which does the work, and this motor has been controlled by varying and reversing the field of the generator and sometimes by varying the field of the motor. The field circuits of both the motor and the special generator have usually been supplied from some auxiliary source of current. In order to prevent the voltage of the special generator of such a system from being varied so rapidly as to cause dangerously large armature currents, it has been proposed to provide means for stopping the progression of the main motor controller in case the current in the motor armature circuit exceeds a predetermined value. These proposed schemes for protecting against dangerously large currents, while operating satisfactorily to prevent current-increasing progression of the main controller while the armature current exceeds such predetermined value, also at the same time incidentally prevent current decreasing movement thereof. Under some circumstances current-decreasing movement of the controller is eminently desirable, even though current-increasing movement is prevented.

In my prior Patent No. 989,063, I have described two arrangements in which current-decreasing operation of a controller for such a system is obtainable at all times, while current-increasing operation of such controller is prevented in case the motor armature current exceeds a predetermined value.

It is the object of my present invention to go one step further and provide for obtaining current-decreasing operation of the controller automatically in case the motor armature current exceeds a higher predetermined value.

My invention, while particularly adapted for systems such as above described, is also applicable in some of its phases to other systems.

The various novel features of my invention will be apparent from the description and drawings, and will be particularly pointed out in the claims.

The two figures of the drawing show diagrammatically two systems embodying my invention.

In the arrangement shown in Figure 1, an electric motor A drives a generator B, being preferably directly connected thereto, and on the common shaft of the motor and generator is a heavy fly-wheel C. The armature of the generator B is electrically connected to the armature of a working motor D, which may be used to drive any desired machinery.

The motor A is illustrated as being of the three-phase induction type, though obviously other forms of motors could be used instead. In the rotor circuit of this motor is a starting resistance 1 adjustable by means of a short-circuiting bar 2, and a regulating resistance 3 arranged to be cut in and out by a solenoid switch 4, in turn responsive to the current strength in the primary circuit of the motor, as through a series-transformer 5. Other means for varying the speed of the motor A may be used if desired.

The field windings $b$ of the generator and $d$ of the working motor are supplied from any suitable direct current source through a switch 6, the same source also supplying the various controlling circuits. In the circuit of the field coils $b$ is a reversing switch 7, which is biased toward its middle or open position, but which may be moved to its extreme positions by solenoids 8 and 9 respectively to complete the generator field circuit in the desired direction. A number of resistance switches 11 to 15 are provided, the switches 12 to 15 normally short-circuiting resistance sections 17 to 20 respectively in the circuit of the motor field winding $d$. The switches 11 to 15 may be raised by solenoids 21 to 25 respectively, the switches 11 to 14 when raised short-circuiting resistance sections 26 to 29 respectively in the circuit of the generator field winding $b$.

An arm 31 of an intermediate controller E, driven by a reversible motor 32, controls the solenoids 8, 9, 21, 22, 23, 24, and 25. The motor 32 is controlled by a master controller H, by the position of the arm 31, by a polarized relay 33 having its reversible coil 34 in the circuit including the armatures B and D and its polarizing coil 35 connected in any desired manner, as in shunt across the line supplied through the switch 6, and by a series relay 38. Either or both of the coils 34 and 35 may be adjustable, a rheostat 34$^a$ being shown for adjusting the coil 34. The armature of the motor 32 is normally short-circuited by a switch 36, but this switch is automatically opened by a solenoid 37 whenever current is supplied to the pilot motor 32. Thus when current is cut off from such motor the switch 36 is closed, short-circuiting the armature of the pilot motor upon itself to brake it.

The operation of the system is as follows: The primary circuit of motor A is closed and the motor started by moving the bar 2 to cut out the resistance 1. The switch 4 is held open by its solenoid at this time because of the heavy current required for starting the motor. If desired, other means may be used to insure the open condition of this switch during starting. After the motor has gained sufficient speed and the starting resistance has been cut out, the solenoid switch 4 is allowed to close to cut out resistance 3 because of the decrease in the primary current of motor A. The fly-wheel C and the generator armature B are also started with the motor A, and the fly-wheel stores mechanical energy by its rotation. During this starting the arm 40 of the master controller H and the arm 31 of the intermediate controller E are preferably in their vertical or "off" positions. The switch 6 now being closed, the motor field $d$ is at its strongest, for it has none of the resistance sections 17 to 20 in circuit with it. The generator field $b$ is deënergized because the reversing switch 7 is in its middle or open position. The arm 40 is now moved from the contact 43 to one of the other contacts to either side thereof in the proper direction to give the motor D the desired direction of rotation. There may be any number of contacts 41 to 45 coöperating with the arm 40, the number of contact segments 51 to 60 on the intermediate controller suitably corresponding. Assume that this arm is moved into engagement with contact 41. This closes the circuit through the arm 40, contact 41, contact segment 52, arm 31, contact segment 51, switch 49, field coil 46, solenoid 37, and switch 36. The solenoid 37 immediately opens the switch 36, thus throwing the current through the armature 32 of the pilot motor, and the pilot motor begins to rotate to move the arm 31 in the proper direction, here counter-clockwise. As the arm 31 leaves the vertical, it first engages the contact button 61 to complete the circuit of the solenoid 8 to close the reversing switch in the proper direction, say to the left. This completes the circuit of the field coil $b$ of the generator B through the resistance sections 26 to 29, and causes said generator to generate a small electromotive force, which, being impressed on the armature D, may cause the working motor to start and rotate at a low speed.

As the motor 32 continues to move the arm 31 counter-clockwise, said arm leaves button 61 and engages button 62 to connect the solenoid 21 in series with the solenoid 8 to close the switch 11. This short-circuits the resistance section 26 to increase the field strength and therefore the electromotive force of the generator B, thereby increasing the speed of the working motor D. It may also be arranged to cut a section of resistance into circuit with the motor field winding $d$ to decrease the field strength of the working motor to aid in the increasing of its speed, though preferably the motor field strength is not varied until later. As the arm 31 continues to be moved by the motor 32 it successively connects in circuit the solenoids 22, 23, 24, and 25 to raise the switches 12, 13, 14, and 15, thus gradually increasing the field strength of the generator B and decreasing the field strength of the working motor D, both of which actions tend to increase the speed of said motor. When the last switch 15 has been raised the pilot motor 32 stops because the arm 31 has left the segment 52. There may be any number of the solenoids 21 to 25 and a corresponding number of switches 11 to 15. The individual switches of this group may control resistance sections in both the generator and motor field circuits, as do the switches 12, 13, and 14, or in one only of said circuits as do the switches 11 and 15, as desired.

As the solenoids 21 to 25 are successively connected in series with the solenoid 8, the resistance of the circuit including said solenoids is gradually increased, thus slightly diminishing the current in said circuit. In order to avoid a too great variation in the current on this account, a resistance 48 is preferably connected in the circuit including the solenoids. The value of this resistance relative to the resistance of the solenoids may be such as to make the variation of the current due to the cutting in of the solenoids 21 to 25 as small as desired. If the arm 40 had been moved only from button 43 to button 42, however, the motor 32 would not have continued to drive the arm 31 to cause the operation of all of the switches 11 to 15 inclusive. Instead, when the arm 31 has reached contact 63, as illustrated, thereby having caused the closing of the switches 11 and 12, it will also have left the contact segment 53, thereby breaking the circuit of the pilot motor 32.

If the load is heavy the working motor requires more power for its starting than the motor A can furnish. The current rising in the primary of transformer 5 by reason of this heavy load, the switch 4 is opened, thus inserting resistance 3 in the rotor circuit of motor A. This increases the slip of motor A and permits said motor to slow down, thus allowing the fly-wheel C to give up some of the mechanical energy it has stored, which energy helps the motor A to drive the generator B to supply electrical energy at the rate demanded by the motor D to drive its load.

When it is desired to slow down or stop the motor D the arm 40 is moved toward or to the contact 43. This causes the motor 32 to move the arm 31 back toward the vertical, or in a clockwise direction, allowing some or all of the switches 15, 14, 13, 12, 11, and 7 to return to their normal positions in the order named to increase the field strength of the motor D, to decrease the electromotive force of the generator B, and finally to interrupt the circuit of the generator field winding $b$. While this is taking place, the motor D acts temporarily as a generator to supply the armature of the machine B, the latter serving as a motor to help restore energy to the fly-wheel C. There is powerful dynamic braking effect upon the working motor due to its acting as a generator. When the motor 32 drives the arm 31 in a clockwise direction, the field coil 47 is energized instead of the field coil 46, the motor circuit being completed through the proper contacts of the master controller H and of the intermediate controller E, the switch 50, the field coil 47, the solenoid 37, and the armature of the motor 32. The solenoid 37 holds the switch 36 open while this circuit is maintained. When the load on the generator B diminishes below the value at which the switch 4 opened, either because the motor D has ceased accelerating or because said motor is being slowed down and is running as a generator to drive the machine B as a motor, the diminished current in the primary of the transformer 5 causes the solenoid switch 4 to close. This increases the speed of the motor A so that the latter may supply or help supply energy to the fly-wheel C. The fly-wheel thus stores up any excess of energy supplied when the rate of such supply exceeds the rate at which energy is demanded by the working motor, and gives up said stored energy whenever the rate of energy demanded is greater than the rate of energy supplied. When the arm 40 is moved in the other direction from the vertical to engage the contacts 44 or 45, the arm 31 is caused to move similarly in a clockwise direction, energizing the solenoid 9 to close the reversing switch 7 to the right and causing as many of the switches 11 to 15 to be raised as desired. The cycle described above is repeated save that the direction of rotation of the working motor D is reversed.

If for any reason, as because the movement of the arm 31 is too rapid either toward or from the vertical, the current in the armature circuit of the machines B and D should rise beyond the predetermined value for which the polarized relay 33 is set, the movable member of said solenoid is moved to open the switch 49 or 50 as the case may be, thus disconnecting the motor 32 from the source of supply. Only that one of the switches 49 and 50 through which the current for the motor 32 is being supplied, or would be supplied, to increase the current, is opened. The opening of the switch 49 or 50 deënergizes the solenoid 37 and thus allows the switch 36 to close to short-circuit the armature of the motor 32 upon itself. The interruption of the pilot motor circuit and the short-circuiting of the pilot motor armature upon itself cause the armature 32 to stop immediately wherever it may be. In some instances the short-circuiting switch 36 and its solenoid may be omitted. The circuit of the pilot motor for movement in the current-increasing direction cannot now be closed until the current in the armature circuit of the motor D has fallen below the predetermined value for which the polarized relay 33 is set, when said polarized relay allows the switch 49 or 50 to close again. However, the circuit of the pilot motor 32 may be closed for movement in the other direction by a proper movement of the arm 40 of the master controller H. Thus the polarized relay 33 and the switches 49 and 50 prevent the operation of the main controller to increase the current in the armature circuit of the machines B and D if such current exceeds a predetermined value, while at all times allowing the operation of such controller to decrease such current.

If in spite of the operation of the polarized relay 33 the motor armature current for any reason rises beyond a still higher predetermined value, for which the series relay 38 is set, said series relay 38 is closed and connects the upper contacts of the switches 49 and 50 directly to the line independently of the master controller H and the intermediate controller E. Since that one of the switches 49 and 50 through which current would be supplied for current-increasing operation of the main controller is now held open by the polarized relay 33, the closing of the series relay 38 causes current to be supplied to the pilot motor through the proper field coil 46 or 47 to produce current-decreasing operation of the controller, which movement continues as long as the current in the motor armature remains above the predetermined value for which the series relay 38 is set. The operation of the series relay 38 does not interfere with the production of current-decreasing operation of the main controller in response to suitable movement of the master controller H, for the connection of the motor 32 through the series relay 38 is the same as that through the master controller H and intermediate controller E for producing such current-decreasing operation and such operation is already being produced by the series relay.

When it is desired to vary the speed of the motor D from any value in one direction to any value in the other direction the arm 40 is moved from the contact with which it was in engagement, say 42, to a contact on the other side of 43, say 45. This causes arm 31 to move to its extreme clockwise position, so that the switches 12, 11, and 7 are returned to their normal position in the order named, the switch 7 then moved to the right, and the switches 11 to 15 raised in the order named. By the arrangement of contact segments 51 to 60 shown, the motor 32 will move the arm 31 to a position corresponding to any circuit-closing position of the arm 40, whatever the position of the arm 31 may previously have been. The movement of the arm 31 may be stopped at any point by so moving the arm 40 that it is not in engagement with any of the contacts 41 to 45 inclusive. If in this operation of the controller, or in any other operation of the controller, the current in the armature circuit of the machines B and D exceeds in either direction the predetermined maximum for which the polarized relay 33 is set, such relay immediately operates to open the switch 49 or 50 to stop the further progression of the intermediate controller E and of the switches controlled thereby. This ordinarily effectively prevents the current in this circuit from becoming unduly large. But since only one of the switches 49 and 50 is opened, it is possible by proper manipulation of the master controller H to cause the intermediate controller E and the switches controlled thereby to operate to decrease the current in the armature circuit of the machines B and D. And if at any time the current in the motor armature circuit exceeds the higher predetermined value for which the series relay 38 is set, such relay closes and automatically causes a current-decreasing operation of the intermediate controller E and of the switches controlled thereby. This is the case regardless of the direction in which the machine D is rotating and regardless of whether such machine is receiving current as a motor or supplying current as a generator driven by the momentum of the moving parts.

Figure 2:
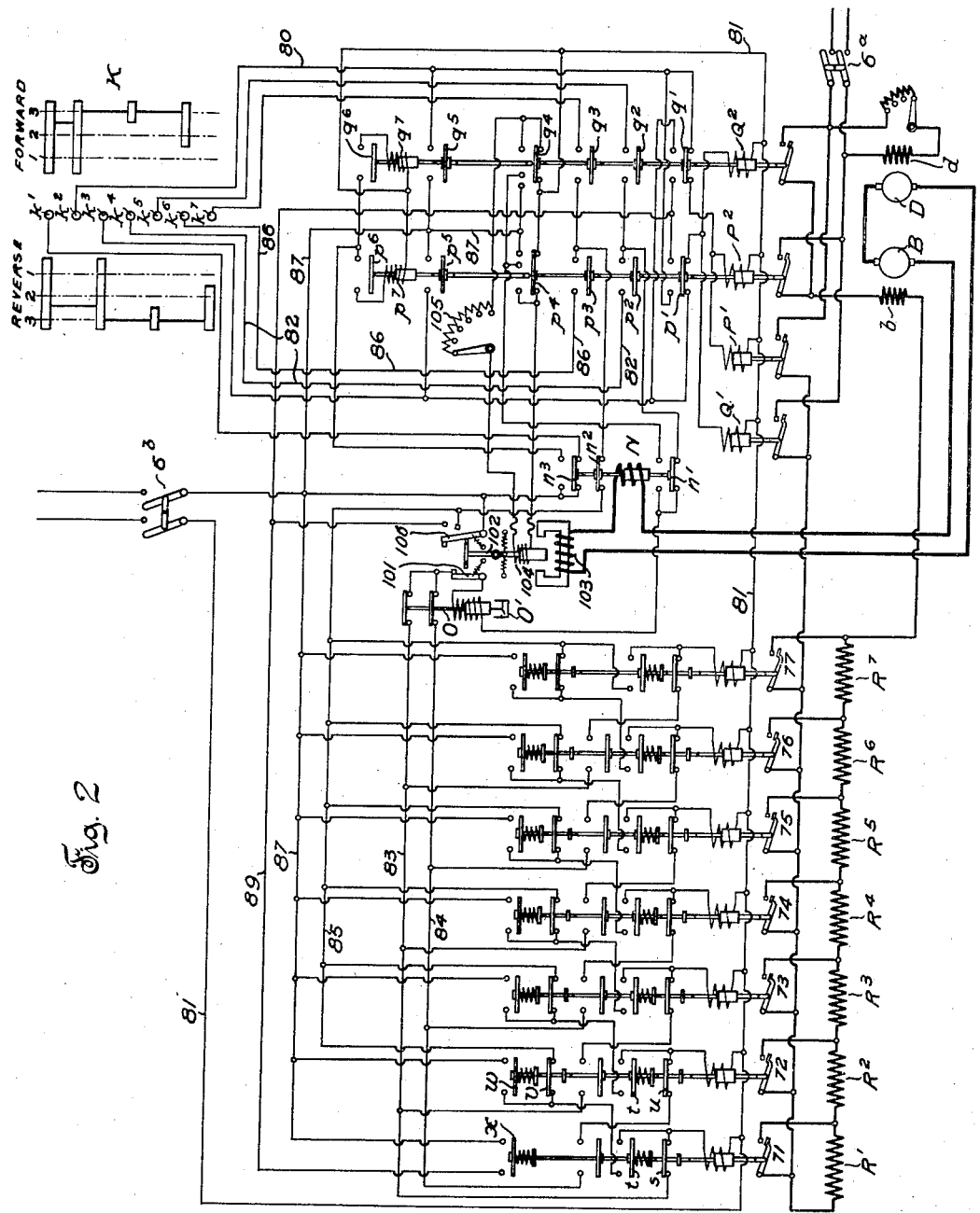

Fig. 2 shows my invention as applied to a system of the same general nature but with a different type of control apparatus. Here, as before, the armature of the main motor D is connected to that of the generator B, and the field windings $b$ and $d$ of the generator and motor respectively are supplied from a separate source of current, in this case through the switch $6^a$. The control apparatus controls the strength of the field winding $b$ of the generator, though the field winding $d$ of the motor may also be adjustable in strength, either by the main control apparatus or by means of a rheostat. This field circuit of the generator is connected to the line for one direction of current by electromagnetically operated switches $P'$ and $P^2$, and for the other direction of current by similar switches $Q'$ and $Q^2$. The field resistance, made up of sections $R'$ to $R^7$, is normally connected in the field circuit of the generator B, but may be short-circuited section by section by electromagnetically operated switches 71 to 77 inclusive. The master switch K controls the operation of the several switches $P'$, $P^2$, $Q'$, $Q^2$, and 71 to 77, operating current for these switches being supplied from any suitable source of current through a switch $6^b$. In this instance the control circuits and the field circuits are supplied from separate sources of current; though if desired they may be supplied from the same source, as in the arrangement shown in Fig. 1. The master switch K has three forward and three reverse positions, and an intermediate off position. In the first position forward or reverse, the switches $P'$ and $P^2$ or $Q'$ and $Q^2$ are closed, and the field circuit of the generator is connected to its source of supply through all of the resistance sections $R'$ to $R^7$. In the second position forward or reverse, a maintaining circuit is completed for holding closed those of the switches 71 to 77 which have been closed. In the third position forward or reverse, an actuating circuit is completed for the switches 71 to 77 inclusive, by means of which these switches are caused to close in succession.

Suppose the switches $6^a$ and $6^b$ are closed and the motor switch K is moved from its off to its first forward position. This connects the fingers $k'$ and $k^2$, thus completing the circuit from one side of the source of supply through such fingers, the wire 80, the lower interlocking switch $q'$ on the switch $Q^2$, the actuating coils of the switches $P'$ and $P^2$, to the return wire 81, common to the solenoids of all the electromagnetic switches. This causes the switches P' and P² to close. The switch P² in closing closes the interlocking switches $p^2$, $p^3$, $p^5$, and $p^6$, and moves the interlocking switches $p'$ and $p^4$ from lower to upper position. The closing of the switches P' and P² completes the circuit of the generator field winding $b$ through all the resistance sections R' to R⁷, and the generator B commences to generate. This supplies the armature of the motor D with current, and may start such motor to rotating. This condition continues while the master controller K remains in its first forward position or if it is moved to its second forward position. In order to increase the voltage of the generator B, the master controller K is moved to the third forward position, in which a circuit is completed from the source through the fingers $k'$ and $k^4$ to the wire 82, the interlocking switch $p^2$, the switch $n'$ of the series relay N, the coil of the notching relay O, the switch 101, and through the two contacts of the notching relay O to the wires 83 and 84 respectively. These two wires are connected, through various interlocking contacts on the switches 71 to 77, to the actuating coils of the switches 71, 73, 75, 77, and 72, 74, 76 respectively. With the controller K in this third forward position, the switches 71 to 77 close successively under the control of the notching relay O and the switch 101. This action of this switch 101 will be described more fully hereinafter. If desired, a dash-pot O' or similar device may be provided for retarding the closing motion of the notching relay O, or such relay may be omitted altogether.

The arrangement of the interlocking switches on the resistance switches 71 to 77 is such that each of the latter switches, by opening switch $s$ and closing switch $t$, shifts its actuating coil from connection with one of the actuating wires 83 or 84 to connection, through a switch $v$ on the next resistance switch to the right, with the first maintaining wire 85. This wire 85, in the second and third forward positions of the master switch, is fed through the fingers $k'$ and $k^6$, the wire 86, the interlocking switch $p^3$, and the switch $n^2$ of the series relay N. The interlocking switch $u$ on each of the resistance switches 71 to 76, when closed by the closing of its associated resistance switch, serves to complete the circuit of the actuating coil of the next resistance switch to the right. On each of the resistance switches 72 to 77 there are interlocking switches $v$ and $w$, which upon the closing of their associated resistance switches shift the actuating coil of the preceding resistance switch (to the left) from connection with the first maintaining wire 85 to connection with the second maintaining wire 87. The wire 87 is connected directly to the positive side of the source, independently of the master switch K. With this arrangement, in order for any switch 71 to 76 to open, it is necessary that the next switch to the right be first opened. The resistance switch 71 is provided with an interlocking switch $x$ which, when such resistance switch is closed, is also closed to complete a maintaining circuit for the switches P' and P² or Q' and Q². This maintaining circuit extends from the switch 6ᵇ through the wire 87, interlocking switch $x$, wire 89, and interlocking switch $p'$ and $q'$ to the actuating coils (one in the upper and the other in the lower position) to the actuating coils of the switches P' and P² or Q' and Q². Thus the switches P' and P² or Q' and Q², after having once been closed, are held closed independently of the position of the master switch, as long as the switch 71 remains closed. Since this switch 71 cannot open until all the switches 72 to 77 have opened, the switches P' and P² or Q' and Q² cannot open while any of the resistances R' to R⁷ is cut out of circuit.

The circuits for the reverse positions of the master switch K correspond closely to those for the forward positions thereof, the fingers $k^3$, $k^5$, and $k^7$ taking the place of the fingers $k^2$, $k^4$, and $k^6$, and the switches Q' and Q² and the interlocking switches operated by the switch Q² taking the place of the switches P' and P² and the interlocking switches operated by the switch P².

As long as the master switch K is held in its third forward position, the resistance controlling switches 71 to 77 will close in succession under the control of the notching relay O and the switch 101, and will gradually increase the current in the field circuit of the generator B, thus increasing the voltage of such generator. This increases the voltage applied to the armature of the motor D and therefore the speed of such motor. If during this operation the master switch K be turned to its second forward position, the circuit starting from the finger $k^4$ is interrupted, and the successive closing of the switches 71 to 77 ceases. However, all of the switches 71 to 77 which have been closed will be held closed, the last to close being maintained closed by current supplied through the master switch and the first maintaining wire 85, and the others which have been closed being energized from the second maintaining wire 87. The third position of the master switch is thus an accelerating position, and the second a maintaining position.

If with the master switch K in the third forward position the current in the armature circuit of the machines B and D exceeds a predetermined value, the switch 101 is opened to stop further closing of the switches 71 to 77 and further increase in the voltage of the generator B. This opening of the switch 101 is obtained by the polarized relay 102, one of the coils 103 of which is connected in series with the armature B and D, while the other coil 104 is connected across the circuit supplied by the switch $6^b$ through the interlocking switches $p^4$ in its upper position and $q^4$ in its lower position. For the reverse rotation of the motor D the switch $q^4$ is up and the switch $p^4$ down. Either or both of the coils 103 and 104 may be adjustable, a rheostat 105 for adjusting the strength of the coil 104 being shown. If desired, other means may be provided for adjusting the polarized relay 102. By means of this polarized relay, the switch 101 is opened whenever during the progressive closing of the switches 71 to 77 the current in the armature circuit of the machines B and D exceeds the predetermined value for which the polarized relay is set.

The polarized relay 102 controls a second switch 106. The switch 106 is normally open, but when closed connects the maintaining wires 85, 87, and 89; that is, it connects the maintaining wires 85 and 89 directly to the source, independently of the master switch K. The switch 106 is closed whenever the machine B is acting as a motor and the current in the armature circuit of the machines B and D exceeds the predetermined value for which the relay 102 is set.

If the master switch K is in its second or third forward position and it is desired to slow down the motor D, to stop it altogether, to reverse it at slow speed, or to reverse it at higher speed, the master controller is moved backward to the first forward position, to the off position, to the first or second reverse position, or to the third reverse position respectively. It will be assumed that the master controller is moved from the second or third forward position to the third reverse position, as the operations resulting from this will include all those which would result from any of the other movements of the master controller. It will also be assumed that the motor D is operating in the forward direction with at least some of the resistances R' to $R^7$ cut out.

The movement of the master controller K backward from its second forward position, regardless of how far it goes, breaks the connection of the maintaining wire 85 to the source through the master controller. This deënergizes the operating coil of the last of the resistance switches 71 to 77 inclusive which has been closed, this being the only resistance switch whose actuating coil is dependent upon current from the maintaining wire 85. This switch, say switch 75, at once opens, transferring the actuating coil of the next switch to the left, the switch 74, from the maintaining wire 87 to the maintaining wire 85 and causing such actuating coil to be deënergized. Dash-pots or similar devices may, if desired, be provided for retarding the dropping of the switches 71 to 77 or of the various switches $w$ and $x$. The actuating coils of the switches 73, 72, and 71 will be deënergized successively in a similar manner. This diminishes the voltage of the generator B, and may diminish it sufficiently to cause it to act as a motor receiving current from the machine D, driven as a generator by its own momentum and the momentum of the apparatus driven by it.

If the voltage of the machine D exceeds that of the machine B sufficiently to raise the current in the armature circuit of the two machines above the predetermined maximum for which the polarized relay 102 is set, such relay immediately closes the switch 106, thus connecting the maintaining wire 85 to the maintaining wire 87 and preventing further deënergization of the actuating coils of the switches 71 to 77. The switch 106 will remain closed, preventing further opening of the switches 71 to 77, until the current in the armature circuit of the machines B and D drops below such predetermined maximum, but will open to allow such deënergization to continue as soon as such current falls below such maximum. But with the switch 106 closed, even with the armature current above such maximum, the operator may, by moving the master controller K to the third forward position, cause the switches 71 to 77 to close in proper succession to increase the voltage of B and thus diminish the current in the armature circuit of the machines B and D.

If for any reason the current in the armature circuit should continue to rise and should exceed the higher predetermined value for which the series relay N is set, said relay raises its core, thus opening the switch $n^2$ and raising the switches $n'$ and $n^3$ from lower to upper position. The raising of the switch $n^3$ causes the energization of the solenoid $p^7$, which, for purposes hereinafter apparent, will hold the switches $p^5$ and $p^6$ closed while the switch $n^3$ is raised. The raising of the switch $n^3$ also cuts off the current to the finger $k'$ of the master controller K. The raising of the switch $n^2$ breaks the connection of the wire 85 to the switch $p^3$, but because the switch 106 is closed at this time this produces no effect. The raising of the switch $n'$ disconnects the wires 83 and 84 from the switch $p^2$, but connects them, through the switch $p^4$, directly to the always energized maintaining wire 87. As a result, the lifting of the series relay N causes the switches 71 to 77 inclusive to begin closing in order, independently of the position of the master controller K, beginning at the last one which was caused to be opened before the closing of the switch 106, and continuing in precisely the same manner as if controlled by the master controller K for similar movement until the current in the armature circuit has been reduced below the predetermined value for which the series relay N is set. Then the series relay opens and restores the current-decreasing control of the system to the operator having charge of the master controller K, current-increasing control of the system being withheld from the operator while the switch 106 remains closed. If while the series relay N is raised, the operator moves the master controller K to a position normally producing current-decreasing operation of the system, such movement produces no effect; the effect desired is already being produced by the series relay. However, as long as the voltage of the generator B does not fall sufficiently below that of the machine D to cause an excessive flow of current in the armature circuit of said machines, neither the polarized relay 102 nor the series relay N will operate, thus allowing all of the closed switches 77 to 71 inclusive to open in order. If such current is still not large enough to cause the closing of the switch 106, the switches P′ and P² then open, the maintaining circuit of the actuating coils of these switches being interrupted by the opening of the interlocking switch $x$ on the resistance switch 71. But if upon the opening of the switch 71 the current in the armature circuit had risen sufficiently to cause the polarized relay 102 to close the switch 106, the maintaining wire 89 for the switches P′ and P² will not be disconnected from the source by the opening of the interlocking switch $x$, and such switches P′ and P² will not open until the armature current has decreased enough to cause the switch 106 to open. In some cases, the connection of the wire 89 to the switch 106 may be omitted.

The operation would stop with the opening of the switches P′ and P² if the master switch had been moved only to off position. But if it had been moved to the third (or any) reverse position, the opening of the switches P′ and P² completes the circuit of the actuating coils of the switches Q′ and Q² through the contact fingers $k'$ and $k^3$ of the master controller and the interlocking switch $p'$, thus reversing the direction of current in the field coil $b$ and therefore the voltage of the machine B. The opening of the switch P² and the closing of the switch Q², acting through the switches $p^4$ and $q^4$, reverse the direction of current in the polarizing coil 104 of the polarized relay 102.

After the switches Q′ and Q² are closed, the switches 71 to 77 are closed successively to raise the voltage of the generator B in its reverse direction. If during this operation, the current in the armature circuit of the machines B and D rises above the predetermined value for which the polarized relay 102 is set, said relay swings in the opposite direction from that heretofore described and opens the switch 101 to prevent the further closing of the switches 71 to 77 until the current in said armature circuit falls below such predetermined value. The opening of the switch 101, however, does not prevent the current in said armature circuit from being reduced by moving the master controller K out of its second or third reverse positions, which movement will cause proper operation of the switches 71 to 77, and even by a movement of the master controller K to a forward position, of the switches P′ and P² and Q′ and Q², to diminish the current in such armature circuit.

If after the closing of the switches Q′ and Q², and perhaps the closing of some or all of the switches 71 to 77, inclusive, the current in the armature circuit for any reason should rise not only to the point where the polarized relay 102 opens the switch 101 but to the higher point where the series relay N operates, said series relay will take control of the system; and, regardless of the position of the master controller K, will cause a current-decreasing operation of the system until the current has been reduced below the point at which the relay N operates. Assume that the relay N operates after the switches Q′, Q², 71, 72, 73, and 74 have been closed. The raising of the switch $n^2$ then deënergizes the first maintaining wire 85 and causes the switches 74, 73, 72, and 71 to drop in order unless the armature current falls below the predetermined value for which the series relay is set. Should the series relay N still remain up, the opening of the switch $x$ upon the dropping of the switch 71 causes the deënergization of the operating solenoids of the switches Q′ and Q², allowing said switches to open to interrupt the circuit of the field winding $b$ of the generator B. The switches $q'$, $q^2$, $q^3$, and $q^4$ drop with the switch Q², the switches $q^5$ and $q^6$ being held in their upper positions, to which they were lifted when the switch Q² was closed, by the solenoid $q^7$, which is energized through the switch $q^6$ and the switch $n^3$ in its upper positions. The dropping of the switch $q^4$ deënergizes the polarizing coil 104 of the polarized relay 102, thus allowing the closing of the switch 101; which closing, however, produces no immediate result because switch $n'$ is up and the switches $p^4$ and $q^4$ are down. The series relay still being raised, the dropping of the switch $q'$ completes a circuit which extends from the wire 87 through the switch $q^5$ in its upper position and the switch $q'$ in its lower position to the operating solenoids of the switches P′ and P². These two last-named switches then close, raising the switches $p'$, $p^2$, $p^3$, $p^4$, $p^5$, and $p^6$. The raising of the switch $p^4$ completes the circuit of said polarizing coil 104 in the opposite direction, to cause the still excessively excited polarized relay 102 to close the switch 106. The closing of the switch $p^4$ also completes a circuit extending from the constantly energized wire 87 through the middle upper contact of the switch $p^4$, the switch $n'$ in its upper position, the coil of the notching relay O, and the switch 101, to the wires 83 and 84, thus causing the successive closing of the switches 71 to 77 inclusive in the manner already described. The first maintaining wire 85 is now energized on account of the closed position of the switch 106, so that the actuating coil of the last of the switches 71 to 77 which have been closed is supplied with current from the first maintaining wire 85 and those of all previously raised ones of the switches 71 to 77 from the second maintaining wire 87 in a manner identical with that already described. The successive closing of the switches 71 to 77 inclusive continues while the current in the armature circuit remains above the predetermined value for which the series relay N is set, said relay opening as soon as such current drops below that value. If while the series relay N is raised, the operator moves the master controller K to a position normally producing current-decreasing operation of the system, such movement produces no effect; the effect desired is already being produced by the series relay. The dropping of the relay N at any time during the series of operations just described restores the current-decreasing control of the system to the master controller K, the current-increasing control of the system being withheld until the current drops sufficiently to allow the polarized relay 102 to swing to normal or middle position. The dropping of the relay N also causes the deënergization of the solenoid $q^7$, which deënergization allows the switches $q^5$ and $q^6$ to drop. In this way the polarized relay 102 and the switches 101 and 106 prevent operation of the various switches $P'$ and $P^2$, $Q'$ and $Q^2$, and 71 to 77 to increase the current in the armature circuit of the machines B and D whenever such current already exceeds a predetermined value; and the series relay N automatically causes the current-decreasing operation of said switches, regardless of the position of the master controller, whenever such current exceeds a higher predetermined value. This current may be in either direction, and may be due to an excess of the voltage of either of the machines B and D over that of the other. The operation of the switches referred to will stop at any point whenever such armature current exceeds the value for which the polarized relay 102 is set; and the switches will start to operate in reverse order whenever such current exceeds the higher value for which the series relay N is set. While for current-increasing control of the system the operation of these switches is prevented by the operation of the polarized relay 102, it is allowed at all times for the current-decreasing operation thereof, and is caused automatically for such current-decreasing operation whenever the series relay N is operated. Should the master controller K be moved to a position which would normally produce a current-decreasing operation of the controller at the same time that the series relay N is raised, such operation of the master controller produces no result, for the result which would normally be produced by such movement is already being automatically produced on account of the raised condition of the series relay N.

Various modifications may be made in the arrangements herein shown and described, and all such which come within the spirit and scope of my invention I aim to cover in the following claims.

What I claim as new is:

1. In combination, a generator, means for varying and reversing the voltage thereof, a motor connected to said generator, and means responsive to the current in the motor circuit for preventing said controlling means from varying the voltage of said generator to increase the current in said circuit when said current exceeds a predetermined value, and for causing the automatic variation of the voltage of said generator to decrease such current when the latter exceeds a higher predetermined value.

2. In combination, a generator, a motor connected to said generator, means for varying the voltage of said generator, and means responsive to the current in the motor circuit for preventing the voltage of the generator from being varied to increase the current in the motor circuit beyond a predetermined value, and for causing the automatic variation of the voltage of said generator to decrease such current when the latter exceeds a higher predetermined value.

3. In combination, a generator having a separately excited field circuit, a field resistance, switches for connecting said field circuit to a source of current for either direction of current flow and for regulating the amount of said resistance in said circuit, a master switch controlling the operation of said switches, a motor connected to said generator, and means responsive to the current in the motor circuit for preventing said switches from responding to movements of the master switch during retardation, reversal, or acceleration of the motor to increase the current in the motor circuit beyond a predetermined value, and for causing the automatic operation of said switches during retardation, reversal, or acceleration of the motor to decrease the current in the motor circuit if such current exceeds a higher predetermined value.

4. In combination, a generator having a separately excited field circuit, a field resistance, switches for connecting said field circuit to a source of current and for regulating the amount of said resistance in said circuit, a motor connected to said generator, and means responsive to the current in the motor circuit and coöperating with said switches for preventing the operation of said switches to increase the current in the motor circuit beyond a predetermined value, and for causing the automatic operation of said switches to decrease the current in the motor circuit if such current exceeds a higher predetermined value.

5. In combination, a generator having a separately excited field circuit, a field resistance, switches for connecting said field circuit to a source of current for either direction of current flow and for regulating the amount of said resistance in said circuit, a motor connected to said generator, and means responsive to the current in the motor circuit and coöperating with said switches for preventing such resistance from being inserted, the connection of the field circuit with the source reversed, or the resistance cut out if such action would increase the current in the motor circuit beyond a predetermined value, and for automatically causing some or all of such actions if they would decrease such current and the latter exceeds a higher predetermined value.

6. In combination, a generator having a separately excited field circuit, a field resistance, electrically controlled switches for connecting said field circuit to a source of current through said resistance and for regulating the amount of said resistance in the field circuit, a master switch for controlling the operation of said switches, a motor connected to said generator, and means responsive to the current in the motor circuit for preventing said switches from cutting out or re-inserting such resistance if such cutting out or re-insertion would increase the current in the motor circuit beyond a predetermined value, and for causing the automatic operation of said switches to cut out or reinsert said resistance if such cutting out or reinsertion would decrease the current in the motor circuit and such current exceeds a predetermined value.

7. In combination, a generator, means for varying the voltage thereof, a motor connected to said generator, and means responsive to the current in the motor circuit for preventing an increase in the voltage of said generator sufficiently to increase the current in the motor circuit above a predetermined value, and for automatically causing a decrease in said voltage if such decrease would diminish such current and the latter exceeds a predetermined value.

8. In combination, a generator, means for varying the voltage thereof, a motor connected to said generator, and means responsive to the current in the motor circuit for preventing the voltage of the generator from being decreased sufficiently to raise the current in the motor circuit above a predetermined value when the motor acts as a generator, and for automatically causing a change in such voltage if such change would diminish such current and the latter exceeds a predetermined value.

9. In combination, a generator, a motor connected to said generator, means for reversing the polarity of said generator, and means responsive to the current in the motor circuit for preventing such reversal when it would raise the current in the motor circuit beyond a predetermined value, and for automatically causing such reversal if it would decrease such current and the latter exceeds a predetermined value.

10. In combination, a separately excited motor adapted to have a voltage impressed upon its armature, a controller for varying the voltage impressed on the armature of said motor, and means for preventing said controller from varying such impressed voltage to raise the current in the motor armature circuit if such current exceeds a predetermined value, and for causing the automatic variation of such impressed voltage to diminish such current if the latter exceeds a predetermined value.

11. In combination, a generator, means for varying the voltage thereof, a motor connected to said generator, and means responsive to the current in the motor circuit for preventing an increase of the voltage of said generator sufficiently to increase the current in the motor circuit beyond a predetermined value, and for causing said voltage to be changed automatically if such change would diminish such current and the latter exceeds a predetermined value.

12. In combination, a generator, means for varying the voltage thereof, a motor connected to said generator, and means responsive to the current in the motor circuit for preventing the voltage of the generator from being decreased sufficiently to raise the current in the motor circuit above a predetermined value when the motor acts as a generator, and for causing said voltage to be decreased automatically if such decrease would diminish such current and the latter exceeds a predetermined value.

13. In combination, a separately excited motor adapted to have a voltage impressed upon its armature, a controller for varying the voltage impressed upon the armature thereof, and means responsive to the current in the motor armature circuit for preventing said controller from increasing such impressed voltage when such increase would raise the motor armature current above a predetermined value and for causing such impressed voltage to be changed automatically whenever it would diminish such current and the latter exceeds a predetermined value.

14. In combination, a separately excited motor adapted to have a voltage impressed upon its armature, a controller for varying the voltage impressed upon the armature thereof, and means responsive to the current in the motor armature circuit for preventing said controller from increasing such impressed voltage when such increase would raise the motor armature current above a predetermined value, and for causing such impressed voltage to be diminished automatically if such diminution would decrease such current and the latter exceeds a predetermined value.

15. In combination, a separately excited motor adapted to have a voltage impressed upon its armature, a controller for varying the potential impressed upon the armature thereof, and means for preventing said controller from changing the voltage impressed upon the armature of said motor whenever such change would increase the current in the motor armature circuit above a predetermined value, and for causing such impressed voltage to be diminished automatically if such diminution would decrease such current and the latter exceeds a predetermined value.

16. In combination, a separately excited motor adapted to have a voltage impressed upon its armature, a controller for varying the potential impressed upon the armature thereof, and means for preventing said controller from decreasing the voltage impressed upon the armature of said motor whenever such decrease would increase the current in the motor armature circuit above a predetermined value and for causing such impressed voltage to be increased automatically whenever it would diminish such current and the latter exceeds a predetermined value.

17. In combination, a motor, a source of supply which sometimes supplies current to such motor and sometimes receives current therefrom, a controller for such motor, and means for preventing the operation of such controller to increase the current in the motor armature beyond a predetermined value, and for causing an automatic decrease of such current if the latter exceeds another predetermined value.

18. In combination, a separately excited generator, a separately excited motor connected thereto, a field resistance in the field circuit of said generator, means for varying said resistance, and means for preventing such variation when it would increase the current in the motor armature circuit beyond a predetermined value, and for automatically causing such variation in the proper sense to decrease such current if the latter exceeds another predetermined value.

19. In combination, a generator, means for varying and reversing the voltage thereof, a motor connected to said generator, and means responsive to the current in the motor circuit for preventing said controlling means from varying the voltage of said generator to increase the current in said circuit when said current exceeds a predetermined value while still allowing it to vary said voltage to diminish the current in said circuit, and for causing said controlling means to operate automatically to vary such voltage to diminish such current when the latter exceeds a higher predetermined value.

20. In combination, in a generator, a motor connected to said generator, means for varying the voltage of said generator, and means responsive to the current in the motor circuit for preventing the voltage of the generator from being varied to increase the current in the motor circuit when such current exceeds a predetermined value while still allowing the voltage of the generator to be varied to reduce such current, and for causing the automatic voltage of the generator to be varied to reduce such current when the latter exceeds a higher predetermined value.

21. In combination, a generator having a separately excited field circuit, a field resistance, switches for connecting said field circuit to a source of current for either direction of current flow and for regulating the amount of said resistance in said circuit, a master switch controlling the operation of said switches, a motor connected to said generator, and means responsive to the current in the motor circuit for preventing said switches from responding to movements of the master switch during retardation, reversal, or acceleration of the motor to increase the current in the motor circuit beyond a predetermined value while still allowing such response to lessen the current in the motor circuit, and for causing the automatic operation of said switches to lessen such current if the latter exceeds a higher predetermined value.

22. In combination, a generator having a separately excited field circuit, a field resistance, switches for connecting said field circuit to a source of current and for regulating the amount of said resistance in said circuit, a motor connected to said generator, and means responsive to the current in the motor circuit and coöperating with said switches for preventing the operation of said switches to increase the current in the motor circuit beyond a predetermined value while still allowing the operation of the switches to decrease such current, and for causing the automatic operation of the switches to decrease such current if the latter exceeds a higher predetermined value.

23. In combination, a generator having a separately excited field circuit, a field resistance, switches for connecting said field circuit to a source of current for either direction of current flow and for regulating the amount of said resistance in said circuit, a motor connected to said generator, and means responsive to the current in the motor circuit and coöperating with said switches for preventing such resistance from being inserted, the connection of the field circuit with the source reversed, or the resistance cut out if such action would increase the current in the motor circuit beyond a predetermined value while still allowing such action if it would decrease such current, and for automatically causing such action if it would decrease such current and the latter exceeds a higher predetermined value.

24. In combination, a generator having a separately excited field circuit, a field resistance, electrically controlled switches for connecting said field circuit to a source of current through said resistance and for regulating the amount of said resistance in the field circuit, a master switch for controlling the operation of said switches, a motor connected to said generator, and means responsive to the current in the motor circuit for preventing said switches from cutting out or re-inserting such resistance only if such cutting out or reinsertion would increase the current in the motor circuit beyond a predetermined value, and for causing the automatic operation of said switches to cut out or reinsert said resistance if such cutting out or reinsertion would decrease the current in the motor circuit and such current exceeds a higher predetermined value.

25. In combination, a generator, means for varying the voltage thereof, a motor connected to said generator, and means responsive to the current in the motor circuit for preventing an increase in the voltage of said generator sufficiently to increase the current in the motor circuit above a predetermined value while still allowing such voltage to be decreased to diminish the current in the motor circuit, and for causing such voltage to be decreased automatically if such decrease would diminish such current and the latter exceeds a predetermined value.

26. In combination, a generator, means for varying the voltage thereof, a motor connected to said generator, and means responsive to the current in the motor circuit when the motor acts as a generator for preventing the voltage of the first mentioned generator from being decreased sufficiently to raise the current in the motor circuit above a predetermined value while still allowing such voltage to be increased to diminish the current in the motor circuit, and for causing such voltage to be increased automatically if such increase would diminish such current and the latter exceeds a predetermined value.

27. In combination, a generator, a motor connected to said generator, means for reversing the polarity of said generator, and means responsive to the current in the motor circuit for preventing such reversal when it would raise the current in the motor circuit and such current exceeds a predetermined value, for allowing such reversal when it would diminish such current, and for causing such reversal automatically if it would diminish such current and the latter exceeds a predetermined value.

28. In combination, a separately excited motor adapted to have a voltage impressed upon its armature, a controller for varying the voltage impressed on the armature of said motor, and means for preventing said controller from varying such impressed voltage to raise the current in the motor armature if such current exceeds a predetermined value while still allowing such voltage to be varied to lessen such current, and for causing such voltage to be varied automatically to lessen such current if the latter exceeds a predetermined value.

29. In combination, a generator, means for varying the voltage thereof, a motor connected to said generator, and means responsive to the current in the motor circuit for preventing an increase of the voltage of said generator sufficiently to increase the current in the motor circuit beyond a predetermined value, for always allowing such voltage to be increased if such increase would diminish such current, and for causing said voltage to be increased automatically if such increase would diminish such current and the latter exceeds a predetermined value when the motor acts as a generator.

30. In combination, a generator, means for varying the voltage thereof, a motor connected to said generator, and means responsive to the current in the motor circuit when the motor acts as a generator for preventing the voltage of the first mentioned generator from being decreased sufficiently to raise the current in the motor circuit beyond a predetermined value, for always allowing such voltage to be decreased if such decrease would diminish such current, and for causing said voltage to be decreased automatically if such decrease would diminish such current and the latter exceeds a predetermined value.

31. In combination, a separately excited motor adapted to have a voltage impressed upon its armature, a controller for varying the voltage impressed upon the armature thereof, and means responsive to the current in the motor armature circuit for preventing said controller from increasing such impressed voltage when such increase would raise the motor armature current above a predetermined value, for always allowing the controller to increase such impressed voltage if such increase would diminish such current, and for causing such voltage to be increased automatically if such increase would diminish such current and the latter exceeds a predetermined value when the motor acts as a generator.

32. In combination, a separately excited motor, a controller for varying the voltage impressed upon the armature thereof, and means responsive to the current in the motor armature circuit for preventing said controller from increasing such impressed voltage when such increase would raise the motor armature current above a predetermined value, for always allowing such impressed voltage to be diminished whenever such diminution would decrease such current, and for causing such impressed voltage to be diminished automatically if such diminution would decrease such current and the latter exceeds a predetermined value.

33. In combination, a separately excited motor adapted to have a voltage impressed upon its armature, a controller for varying the potential impressed upon the armature thereof, and means for preventing said controller from decreasing the voltage impressed upon the armature of said motor whenever such decrease would increase the current in the motor armature circuit above a predetermined value when the motor acts as a generator, for always allowing such impressed voltage to be diminished whenever such diminution would decrease such current, and for causing such impressed voltage to be diminished automatically if such diminution would decrease such current and the latter exceeds a predetermined value.

34. In combination, a separately excited motor adapted to have a voltage impressed upon its armature, a controller for varying the potential impressed upon the armature thereof, and means for preventing said controller when the motor acts as a generator from decreasing the voltage impressed upon the armature of said motor whenever such decrease would increase the current in the motor armature circuit above a predetermined value, for always allowing the controller to increase such impressed voltage if such increase would diminish such current, and for causing such voltage to be increased automatically if such increase would diminish such current and the latter exceeds a predetermined value.

35. In combination, a motor, a source of supply which sometimes supplies current to such motor and sometimes receives current therefrom, a controller for such motor, and means for preventing the operation of such controller to increase the current in the motor armature beyond a predetermined value, for always allowing such current to be decreased, and for causing such current to be decreased automatically in case it exceeds another predetermined value.

36. In combination, a separately excited generator, a separately excited motor connected thereto, a field resistance in the field circuit of said generator, means for varying said resistance, and means for preventing such variation when it would increase the current in the motor armature circuit beyond a predetermined value, for allowing such variation whenever it would decrease such current, and for automatically causing such variation in the proper sense to decrease such current if the latter exceeds another predetermined value.

37. In combination, a generator having a separately excited field circuit, a field resistance, switches for regulating the amount of said resistance in said circuit, a master switch for controlling the operation of said switches, a motor connected to said generator, and means responsive to the current in the motor circuit for regulating the rate at which said switches respond to movements of said master switch to increase such current, and for reversing the nature of such response in case the normal response would increase such current and the latter already exceeds a predetermined value.

38. In combination, a generator having a separately excited field circuit, a field resistance, electrically controlled switches for regulating the amount of said resistance in the field circuit, a master-switch for controlling the operation of said switches, a motor connected to said generator, and means responsive to the current in the motor circuit for regulating the rate at which said switches cut out said resistance when the master-switch is moved to increase the motor speed and the rate at which said switches reinsert said resistance when the master switch is moved to decrease the motor speed provided such cutting out or reinsertion tends to increase such current, and for reversing the effect of the master switch on said electrically controlled switches if the normal effect would tend to increase the current in the motor circuit and such current already exceeds a predetermined value.

39. In combination, a generator having a separately excited field circuit, a field resistance, electrically controlled switches for regulating the amount of said resistance in the field circuit, a master switch for controlling the operation of said switches, a motor connected to said generator, and means responsive to the current in the motor circuit for regulating the rate at which said switches respond to a movement of the master switch from any position to another when such response would increase such current, and for reversing the nature of such response if the normal response would increase such current and the latter already exceeds a predetermined value.

40. In combination, a generator, a motor supplied thereby, a power-operated controller for controlling the electromotive force of said generator, a master controller for controlling the operation of said power-operated controller, and means responsive to the current in the motor circuit for controlling the rate at which the power-operated controller responds to movements of the master controller to increase such current, and for reversing the nature of such response if the normal response would increase the current and the latter already exceeds a predetermined value.

41. In combination, a generator, a motor supplied thereby, a plurality of power-operated switches for controlling the electromotive force of said generator, a master controller for controlling the operation of said power-operated switches, and means responsive to the current in the motor circuit for regulating the rate at which said switches respond to movements of the master controller to increase such current, and for reversing the nature of such response if the normal response would increase such current and the latter already exceeds a predetermined value.

42. In combination, a generator, a motor, the armatures of the generator and motor being connected in series and the generator having a separately excited field, a power-operated controller for controlling the field strength of the generator, a master controller for controlling the operation of said power-operated controller, and means responsive to the current in the circuit including the armatures of the generator and the motor for controlling the rate at which said power-operated controller responds to movements of the master controller to increase such current, and for reversing the nature of such response if the normal response would increase such current and the latter already exceeds a predetermined value.

43. In combination, a motor, a generator, the armatures of the generator and the motor being connected in a series circuit and the generator having a separately excited field, a plurality of power-operated switches for controlling the field strength of said generator, a master controller for controlling the operation of said switches, and means responsive to the current in the circuit including the armatures of the generator and the motor for regulating the rate at which said switches respond to movements of the master controller to increase such current, and for reversing the nature of such response if the normal response would increase such current and the latter already exceeds a predetermined value.

44. In combination, a generator, a motor supplied thereby, an electrically operated controller for varying the electromotive force of said generator, a master switch for controlling the operation of said electrically operated controller, and means responsive to the current in the armature circuit of said motor for regulating the rate at which said electrically operated controller is operated in response to movements of the master switch to increase such current, and for reversing the nature of such response if the normal response would increase such current and the latter already exceeds a predetermined value.

45. In combination, a generator, a motor connected thereto, a plurality of electrically operated switches for controlling the electromotive force of said generator, a master switch for controlling the operation of said switches, and means responsive to the current in the armature circuit of the motor for regulating the rate at which the electrically operated switches respond to movements of the master switch to increase such current, and for reversing the nature of such response if the normal response would increase such current and the latter already exceeds a predetermined value.

46. In combination, a generator, a motor connected thereto, a power-operated controller for controlling the electromotive force of said generator, a master controller for controlling the operation of said power-operated controller, and means responsive to the current in the armature of said motor for stopping the current-increasing progression of the power-operated controller in response to movements of the master controller when the current in said circuit reaches a predetermined value, and for causing the automatic current-decreasing progression of said power-operated controller if such current reaches another predetermined value.

47. In combination, a generator, a motor connected thereto, a plurality of power-operated switches for controlling the electromotive force of said generator, a master controller for controlling the operation of said switches, and means responsive to the current in the armature circuit of said motor for stopping the current-increasing progression of said switches in response to movements of the master controller when the current in said circuit exceeds a predetermined value, and for causing the automatic current - decreasing progression of said switches if such current reaches another predetermined value.

48. In combination, a generator having a separately excited field circuit, a field resistance, switches for regulating the amount of said resistance in said circuit, a master switch for controlling the operation of said switches, a motor connected to said generator, and means responsive to the current in the motor circuit for regulating the rate at which said switches respond to movements of said master switch to increase such current, while leaving said switches free at all times to respond to movements of said master switch to decrease such current, and for reversing the nature of such response in case the normal response would increase such current and the latter already exceeds a predetermined value.

49. In combination, a generator having a separately excited field circuit, a field resistance, electrically controlled switches for regulating the amount of said resistance in the field circuit, a master-switch for controlling the operation of said switches, a motor connected to said generator, and means responsive to the current in the motor circuit for regulating the rate at which said switches cut out said resistance when the master-switch is moved to increase the motor speed and the rate at which said switches reinsert said resistance when the master switch is moved to decrease the motor speed provided such cutting out or reinsertion tends to increase such current, while leaving the switches free at all times to respond to movements of said master switch to decrease such current, and for reversing the effect of the master switch on said electrically controlled switches if the normal effect would tend to increase the current in the motor circuit and such current already exceeds a predetermined value.

50. In combination, a generator having a separately excited field circuit, a field resistance, electrically controlled switches for regulating the amount of said resistance in the field circuit, a master switch for controlling the operation of said switches, a motor connected to said generator, and means responsive to the current in the motor circuit for regulating the rate at which said switches respond to a movement of the master switch from any position to another when such response would increase such current, while leaving said switches free at all times to make such response when the latter would decrease such current, and for reversing the nature of such response if the normal response would increase such current and the latter already exceeds a predetermined value.

51. In combination, a generator, a motor supplied thereby, a power-operated controller for controlling the electromotive force of said generator, a master controller for controlling the operation of said power-operated controller, and means responsive to the current in the motor circuit for controlling the rate at which the power-operated controller responds to movements of the master controller to increase such current, while leaving it free at all times to make such response to decrease such current, and for reversing the nature of such response if the normal response would increase such current and the latter already exceeds a predetermined value.

52. In combination, a generator, a motor supplied thereby, a plurality of power-operated switches for controlling the electromotive force of said generator, a master controller for controlling the operation of said power-operated switches, and means responsive to the current in the motor circuit for regulating the rate at which said switches respond to movements of the master controller to increase such current, while leaving said switches free at all times to make such response to decrease such current, and for reversing the nature of such response if the normal response would increase such current and the latter already exceeds a predetermined value.

53. In combination, a generator, a motor, the armatures of the generator and motor being connected in series and the generator having a separately excited field, a power-operated controller for controlling the field strength of the generator, a master controller for controlling the operation of said power-operated controller, and means responsive to the current in the circuit including the armatures of the generator and the motor for controlling the rate at which said power-operated controller responds to movements of the master controller to increase such current, while leaving said power-operated controller free at all times to make such response to decrease such current, and for reversing the nature of such response if the normal response would increase such current and the latter already exceeds a predetermined value.

54. In combination, a motor, a generator, the armatures of the generator and the motor being connected in a series circuit and the generator having a separately excited field, a plurality of power-operated switches for controlling the field strength of said generator, a master controller for controlling the operation of said switches, and means responsive to the current in the circuit including the armatures of the generator and the motor for regulating the rate at which said switches respond to movements of the master controller to increase such current, while at all times allowing such response to decrease such current, and for reversing the nature of such response if the normal response would increase such current and the latter already exceeds a predetermined value.

55. In combination, a generator, a motor supplied thereby, an electrically operated controller for varying the electromotive force of said generator, a master switch for controlling the operation of said electrically operated controller, and means responsive to the current in the armature circuit of said motor for regulating the rate at which said electrically operated controller is operated in response to movements of the master switch to increase such current, while allowing said electrically operated controller to respond freely to movements of the master switch to decrease such current, and for reversing the nature of such response if the normal response would increase such current and the latter already exceeds a predetermined value.

56. In combination, a generator, a motor connected thereto, a plurality of electrically operated switches for controlling the electromotive force of said generator, a master switch for controlling the operation of said switches, and means responsive to the current in the armature circuit of the motor for regulating the rate at which the electrically operated switches respond to movements of the master switch to increase such current, while allowing said switches freely to respond to movements of the master switch to decrease such current, and for reversing the nature of such response if the normal response would increase such current and the latter already exceeds a predetermined value.

57. In combination, a generator, a motor connected thereto, a power-operated controller for controlling the electromotive force of said generator, a master controller for controlling the operation of said power-operated controller, and means responsive to the current in the armature of said motor for stopping the current-increasing progression of the power-operated controller in response to movements of the master controller when the current in said circuit reaches a predetermined value, while at all times allowing the current-decreasing progression of said power-operated controller, and for causing the automatic current-decreasing progression of said power-operated controller if such current reaches another predetermined value.

58. In combination, a generator, a motor connected thereto, a plurality of power-operated switches for controlling the electromotive force of said generator, a master controller for controlling the operation of said switches, and means responsive to the current in the armature circuit of said motor for stopping the current-increasing progression of said switches in response to movements of the master controller when the current in the circuit exceeds a predetermined value, while at all times allowing the current-decreasing progression of said switches, and for causing the automatic current-decreasing progression of said switches if such current reaches another predetermined value.

59. In combination, a generator, means for varying and reversing the voltage thereof, a motor connected to said generator, and means responsive to the current in the motor circuit for causing the automatic operation of said voltage-controlling means to decrease such current in case the latter exceeds a predetermined value.

60. In combination, a generator, a motor connected to said generator, manually controlled means for varying the voltage of said generator, and means responsive to the current in the motor circuit for producing the automatic operation of said voltage-varying means in the proper sense to decrease the current in the motor circuit if such current exceeds a predetermined value.

61. In combination, a generator having a separately excited field circuit, a field resistance, switches for connecting said field circuit to a source of current for either direction of current flow and for regulating the amount of said resistance in said circuit, a master switch controlling the operation of said switches, a motor connected to said generator, and means responsive to the current in the motor circuit for causing the proper automatic operation of said switches during retardation, reversal, or acceleration of the motor to decrease the current in the motor circuit if the latter exceeds a predetermined value.

62. In combination, a generator having a separately excited field circuit, a field resistance, switches for connecting said field circuit to a source of current and for regulating the amount of said resistance in said circuit, a motor connected to said generator, and means responsive to the current in the motor circuit and coöperating with said switches for causing the proper automatic operation of said switches to decrease the current in the motor circuit if the latter exceeds a predetermined value.

63. In combination, a generator having a separately excited field circuit, a field resistance, switches for connecting said field circuit to a source of current for either direction of current flow and for regulating the amount of said resistance in said circuit, a motor connected to said generator, and means responsive to the current in the motor circuit and coöperating with said switches for automatically causing said resistance to be inserted, the connection of the field circuit with the source reversed, and the resistance cut out, all in proper order, if such action would decrease the current in the motor circuit and such current exceeds a predetermined value.

64. In combination, a generator having a separately excited field circuit, a field resistance, electrically controlled switches for connecting said field circuit to a source of current through said resistance and for regulating the amount of said resistance in the field circuit, a master switch for controlling the operation of said switches, a motor connected to said generator, and means responsive to the current in the motor circuit for causing said switches automatically to cut out or reinsert said resistance if such cutting out or reinsertion would decrease the current in the motor circuit and such current exceeds a predetermined value.

65. In combination, a generator, a motor connected to said generator, means for reversing the polarity of said generator, and means responsive to the current in the motor circuit for causing such reversal automatically if it would diminish the current in the motor circuit and such current exceeds a predetermined value.

66. In combination, a separately excited motor adapted to have a voltage impressed upon its armature, a manually controlled controller for varying the voltage impressed on the armature of said motor, and means for causing the automatic operation of said controller to vary such impressed voltage to diminish the current in the motor armature circuit whenever such current exceeds a predetermined value.

67. In combination, a motor, a source of supply which sometimes supplies current to such motor and sometimes receives current therefrom, a manually controlled controller for such motor, and means for causing the automatic operation of said controller to decrease the current in the motor armature if such current exceeds a predetermined value.

68. In combination, a separately excited generator, a separately excited motor connected thereto, a field resistance in the field circuit of said generator, manually controlled means for varying said resistance, and means for causing the automatic operation of said resistance-varying means to decrease the current in the motor armature circuit if such current exceeds a predetermined value.

69. In combination, a generator having a separately excited field circuit, a field resistance, switches for regulating the amount of said resistance in said circuit, a master switch for controlling the operation of said switches, a motor connected to said generator, and means responsive to the current in the motor circuit for causing the automatic operation of said switches as if in response to a current-decreasing operation of said master switch, regardless of the actual position of said master switch, whenever such current exceeds a predetermined value.

70. In combination, a generator having a separately excited field circuit, a field resistance, electrically controlled switches for regulating the amount of said resistance in the field circuit, a master switch for controlling the operation of said switches, a motor connected to said generator, and means responsive to the current in the motor circuit for producing the automatic operation of said switches as if in response to a current-decreasing movement of the master switch, regardless of the actual position thereof, if such current exceeds a predetermined value.

71. In combination, a generator, a motor supplied thereby, a power-operated controller for controlling the electromotive force of said generator, a master controller for controlling the operation of said power-operated controller, and means responsive to the current in the motor circuit for causing the automatic operation of said power-operated controller as if in response to a current-decreasing movement of the master controller, regardless of the actual condition of the master controller, whenever the current in the motor armature circuit exceeds a predetermined value.

72. In combination, a generator, a motor supplied thereby, a plurality of power-operated switches for controlling the electromotive force of said generator, a master controller for controlling the operation of said power-operated switches, and means responsive to the current in the motor circuit for causing said switches to operate automatically as if in response to a movement of the master controller to decrease such current when the latter exceeds a predetermined value.

73. In combination, a generator, a motor, the armatures of the generator and motor being connected in series and the generator having a separately excited field, a power-operated controller for controlling the field strength of the generator, a master controller for controlling the operation of said power-operated controller, and means responsive to the current in the circuit including the armatures of the generator and the motor for causing the power-operated controller to operate automatically as if in response to a movement of the master controller to decrease such current if the latter exceeds a predetermined value.

74. In combination, a motor, a generator, the armatures of the generator and the motor being connected in a series circuit and the generator having a separately excited field, a plurality of power-operated switches for controlling the field strength of said generator, a master controller for controlling the operation of said switches, and means responsive to the current in the circuit including the armatures of the generator and the motor for causing said switches to operate as if in response to a movement of the master controller to decrease such current whenever the latter exceeds a predetermined value.

75. In combination, a generator, a motor supplied thereby, an electrically operated controller for varying the electromotive force of said generator, a master switch for controlling the operation of said electrically operated controller, and means responsive to the current in the armature circuit of said motor for causing the electrically operated controller to operate automatically as if in response to a movement of the master controller to decrease such current whenever the latter exceeds a predetermined value.

76. In combination, a generator, a motor connected thereto, a plurality of electrically operated switches for controlling the electromotive force of said generator, a master switch for controlling the operation of said switches, and means responsive to the current in the armature circuit of the motor for causing said electrically operated switches to operate automatically as if in response to a current-decreasing movement of the master switch if such current exceeds a predetermined value.

77. In combination, a generator, a motor connected thereto, a power-operated controller for controlling the electromotive force of said generator, a master controller for controlling the operation of said power-operated controller, and means responsive to the current in the armature of said motor for causing the automatic progression of the power-operated controller as if in response to a current-decreasing movement of the master controller when such current exceeds a predetermined value.

78. In combination, a generator, a motor connected thereto, a plurality of power-operated switches for controlling the electromotive force of said generator, a master controller for controlling the operation of said switches, and means responsive to the current in the armature circuit of said motor for causing the automatic progression of said switches as if in response to a current-decreasing movement of the master controller whenever the current exceeds a predetermined value.

79. In combination, a generator having a separately excited field circuit, a field resistance, switches for regulating the amount of said resistance in said circuit, a master switch for controlling the operation of said switches, a motor connected to said generator, and means responsive to the current in the motor circuit for reversing the effect produced on said resistance-regulating switches by said master switch when the normal effect would be to raise the current in the motor circuit and such current already exceeds a predetermined value.

80. In combination, a generator having a separately excited field circuit, a field resistance, electrically controlled switches for regulating the amount of said resistance in the field circuit, a master switch for controlling the operation of said switches, a motor connected to said generator, and means responsive to the current in the motor circuit for reversing the nature of the response of said switches to a movement of the master switch if the normal response would increase such current and the latter already exceeds a predetermined value.

81. In combination, a generator, a motor supplied thereby, a power-operated controller for controlling the electromotive force of said generator, a master controller for controlling the operation of said power-operated controller, and means responsive to the current in the motor circuit for reversing the nature of the response made by the power-operated controller to a movement of the master switch if such movement would normally produce an increase of such current and the latter already exceeds a predetermined value.

82. In combination, a generator, a motor supplied thereby, a plurality of power-operated switches for controlling the electromotive force of said generator, a master controller for controlling the operation of said power-operated switches, and means responsive to the current in the motor circuit for reversing the response made by said switches to a movement of the master controller when the normal response to such movement would increase such current and the latter already exceeds a predetermined value.

83. In combination, a generator, a motor, the armatures of the generator and motor being connected in series and the generator having a separately excited field, a power-operated controller for controlling the field strength of the generator, a master controller for controlling the operation of said power-operated controller, and means responsive to the current in the circuit including the armatures of the generator and the motor for reversing the nature of the response which said power-operated controller makes to movements of the master controller if the normal response would increase such current and the latter already exceeds a predetermined value.

84. In combination, a motor, a generator, the armatures of the generator and the motor being connected in a series circuit and the generator having a separately excited field, a plurality of power-operated switches for controlling the field strength of said generator, a master controller for controlling the operation of said switches, and means responsive to the current in the circuit including the armatures of the generator and the motor for reversing the response made by said switches to movements of the master controller if the normal response would increase such current and the latter already exceeds a predetermined value.

85. In combination, a generator, a motor supplied thereby, an electrically operated controller for varying the electromotive force of said generator, a master switch for controlling the operation of said electrically operated controller, and means responsive to the current in the armature circuit of said motor for reversing the response made by said electrically operated controller to movements of the master switch if the normal response would increase such current and the latter already exceeds a predetermined value.

86. In combination, a generator, a motor connected thereto, a plurality of electrically operated switches for controlling the electromotive force of said generator, a master switch for controlling the operation of said switches, and means responsive to the current in the armature circuit of the motor for reversing the response made by said electrically operated switches to movements of the master controller when the normal response would increase such current and the latter already exceeds a predetermined value.

87. In combination, a generator, a motor connected thereto, a power-operated controller for controlling the electromotive force of said generator, a master controller for controlling the operation of said power-operated controller, and means responsive to the current in the armature of said motor for reversing the progression of the power-operated controller in response to movements of the master controller when the normal progression in response thereto would increase such current and the latter already exceeds a predetermined value.

88. In combination, a generator, a motor connected thereto, a plurality of power-operated switches for controlling the electromotive force of said generator, a motor controller for controlling the operation of said switches, and means responsive to the current in the armature circuit of said motor for reversing the progression of said switches in response to movements of the master controller if the normal progression in response thereto would produce an increase of such current and the latter already exceeds a predetermined value.

Milwaukee, Wis., July 13, 1911.

In testimony whereof I affix my signature, in the presence of two witnesses.

GEORGE B. SCHLEY.

Witnesses:
CHAS. L. BYRON,
ROB. E. STOLL.